US012676367B2

(12) United States Patent
Yun et al.

(10) Patent No.: US 12,676,367 B2
(45) Date of Patent: Jul. 7, 2026

(54) POUCH-TYPE SECONDARY BATTERY COMPRISING PATTERN SEALING PARTS

(71) Applicant: SK On Co., Ltd., Seoul (KR)

(72) Inventors: Jeong Hyeon Yun, Daejeon (KR); Kyu Beom Kim, Daejeon (KR); Chae Rin Ryou, Daejeon (KR); Hyea Won Yun, Daejeon (KR); Ji Hyeon Lee, Daejeon (KR); Jong Chan Im, Daejeon (KR)

(73) Assignee: SK On Co., Ltd., Seoul (KR)

( * ) Notice: Subject to any disclaimer, the term of this patent is extended or adjusted under 35 U.S.C. 154(b) by 589 days.

(21) Appl. No.: 18/097,494

(22) Filed: Jan. 17, 2023

(65) Prior Publication Data

US 2023/0238625 A1      Jul. 27, 2023

(30) Foreign Application Priority Data

Jan. 24, 2022      (KR) ........................ 10-2022-0010262

(51) Int. Cl.
H01M 50/184       (2021.01)
H01M 50/105       (2021.01)

(52) U.S. Cl.
CPC ....... H01M 50/184 (2021.01); H01M 50/105 (2021.01)

(58) Field of Classification Search
CPC ............. H01M 50/105; H01M 50/121; H01M 50/124; H01M 50/178; H01M 50/184; H01M 50/186; H01M 50/211; H01M 50/548; H01M 50/55; H01M 50/557; Y02E 60/10
See application file for complete search history.

(56) References Cited

FOREIGN PATENT DOCUMENTS

| | | |
|---|---|---|
| JP | 2020-149956 A | 9/2020 |
| KR | 10-2012-0102935 A | 9/2012 |
| KR | 10-2019-0042797 A | 4/2019 |
| KR | 10-2021-0032219 A | 3/2021 |

OTHER PUBLICATIONS

Machine translation JP2020149956A (Year: 2020).*
Office Action for Korean Patent Application No. 10-2022-0010262 issued by the Korean Patent Office on Nov. 6, 2025.

* cited by examiner

*Primary Examiner* — Victoria H Lynch
(74) *Attorney, Agent, or Firm* — IP & T GROUP LLP

(57) ABSTRACT
According to an embodiment of the present disclosure, there are provided a pouch-type secondary battery, including an electrode assembly, and a pouch film including an accommodating part in which the electrode assembly is disposed and a sealing part formed by fusion of edges of the accommodating part, wherein the sealing part includes a pattern sealing part on one or more sides among four sides of the pouch-type secondary battery, and the pattern sealing part includes a plurality of sealings provided with one or more discontinuous parts, and a battery module including the pouch-type secondary battery as a unit cell.

8 Claims, 3 Drawing Sheets

POUCH-TYPE SECONDARY BATTERY COMPRISING PATTERN SEALING PARTS

CROSS-REFERENCE TO RELATED APPLICATION

The present application claims priority under 35 U.S.C. § 119(a) to Korean patent application number 10-2022-0010262, filed on Jan. 24, 2022, in the Korean Intellectual Property Office, the entire disclosure of which is incorporated herein by reference.

BACKGROUND

1. Technical Field

The present disclosure relates to a pouch-type secondary battery including a pattern sealing part.

2. Related Art

With the development of the electronics, communications, and space industries, the demand for secondary batteries as an energy power source is rapidly increasing. In particular, as the importance of global eco-friendly policies is emphasized, the electric vehicle market is growing rapidly, and research and development on secondary batteries is actively carried out at home and abroad.

In particular, in an electric vehicle battery in which multiple cells are connected in a series or parallel structure and a high nickel material is used, a technology for increasing stability by controlling the amount of gas generation in each cell and securing a gas discharge channel is required.

SUMMARY

Embodiments provide a pouch-type secondary battery including a pattern sealing part including a plurality of sealings provided with one or more discontinuous parts, which is capable of delaying the vent by distributing pressure of the gas generated inside the pouch.

In accordance with an aspect of the present disclosure, there is provided a pouch-type secondary battery, including an electrode assembly, and a pouch film including an accommodating part in which the electrode assembly is disposed and a sealing part formed by fusion of edges of the accommodating part, wherein the sealing part includes a pattern sealing part on one or more sides among four sides of the pouch-type secondary battery, and the pattern sealing part includes a plurality of sealings provided with one or more discontinuous parts.

In accordance with another aspect of the present disclosure, there is provided a battery module including the pouch-type secondary battery according to an aspect of the present disclosure as a unit cell.

In accordance with another aspect of the present disclosure, there is provided a device including the battery module according to an aspect of the present disclosure as a power source.

According to an embodiment of the present disclosure, a pouch-type secondary battery including a pattern sealing part including a plurality of sealings provided with one or more discontinuous parts, which is capable of delaying the vent by distributing pressure of the gas generated inside the pouch is provided.

BRIEF DESCRIPTION OF THE DRAWINGS

Example embodiments will now be described more fully hereinafter with reference to the accompanying drawings;

however, they may be embodied in different forms and should not be construed as limited to the embodiments set forth herein. Rather, these embodiments are provided so that this disclosure will be thorough and complete, and will fully convey the scope of the example embodiments to those skilled in the art.

Figure 1:
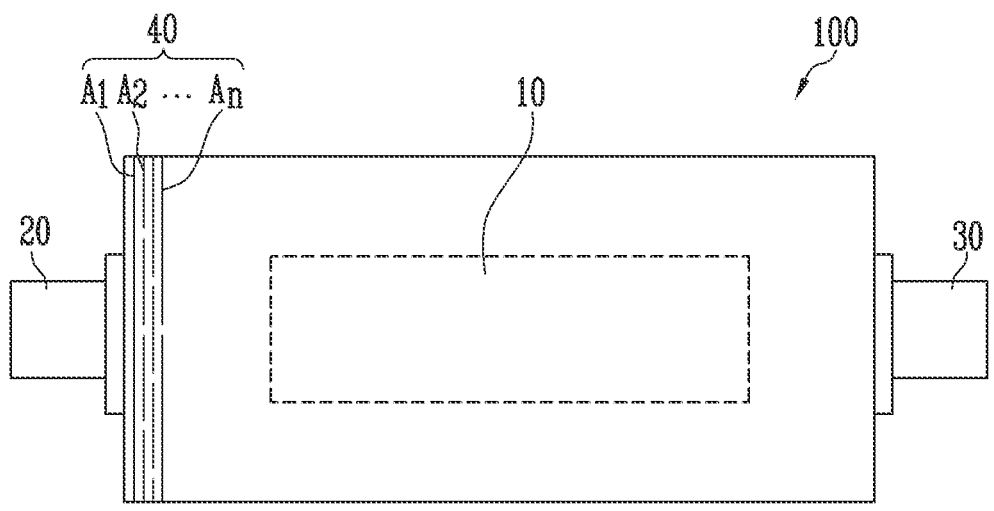

In the drawing figures, dimensions may be exaggerated for clarity of illustration. It will be understood that when an element is referred to as being "between" two dements, it can be the only element between the two dements, or one or more intervening elements may also be present. Like reference numerals refer to like dements throughout.

FIG. 1 is a plan view illustrating a pouch-type secondary battery including one pattern sealing part.

Figure 2:
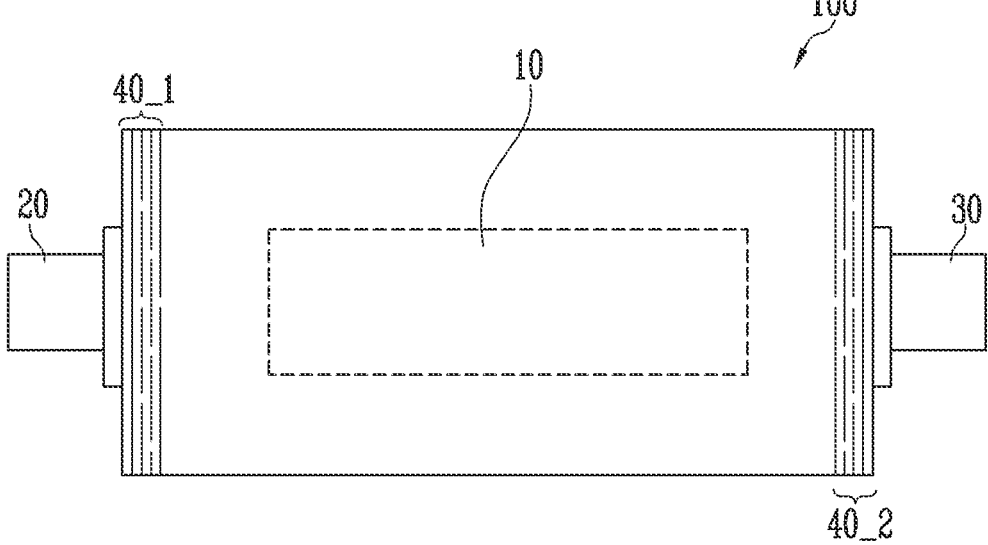

FIG. 2 is a plan view illustrating a pouch-type secondary battery in which two pattern sealing parts are located on sides neighboring each other.

Figure 3:
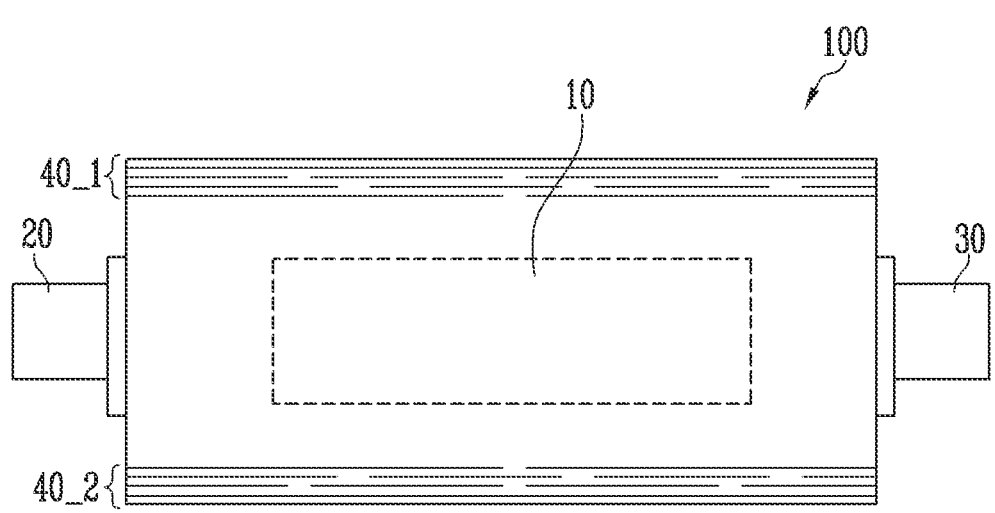

FIG. 3 is a plan view illustrating another example of a pouch-type secondary battery in which two pattern sealing parts are located on sides neighboring each other.

Figure 4:
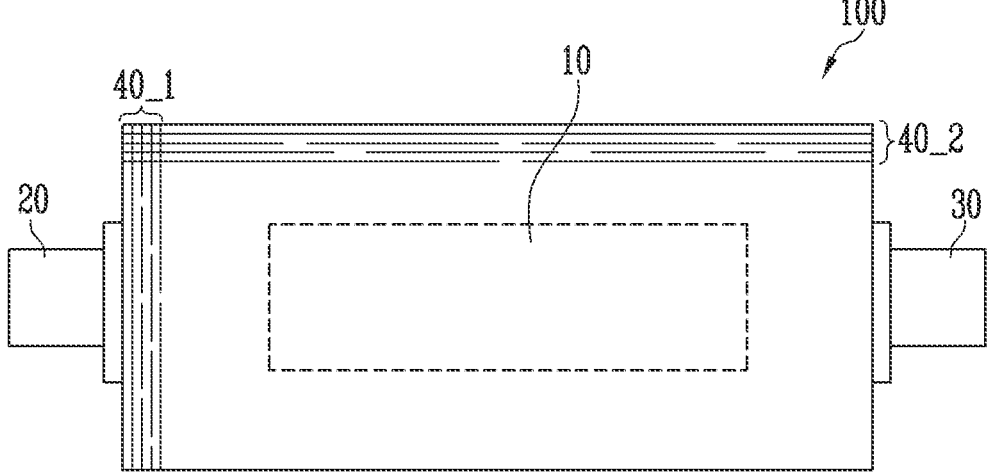

FIG. 4 is a plan view illustrating a pouch-type secondary battery in which two pattern sealing parts are located on skies not neighboring each other.

Figure 5:
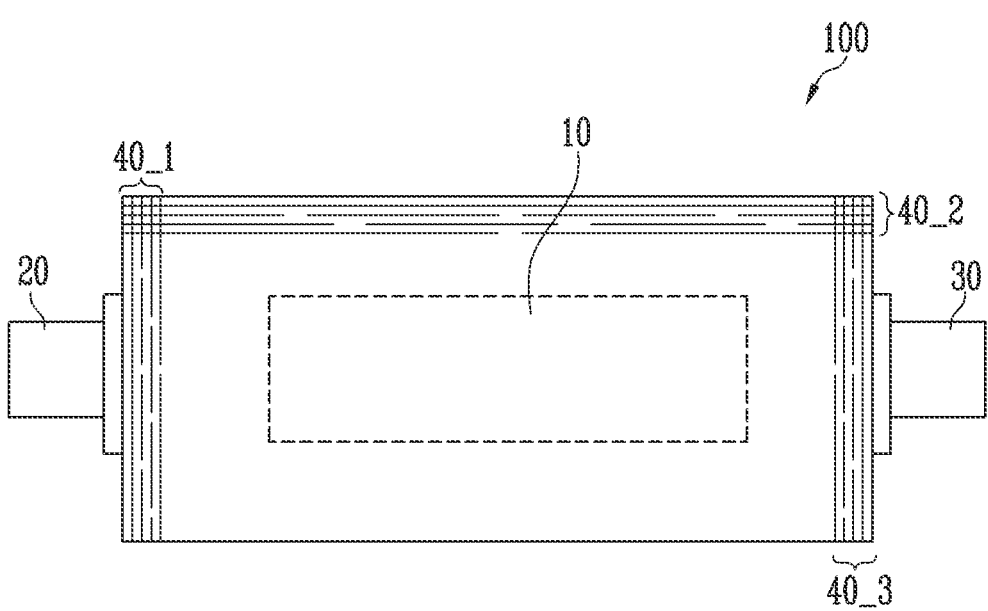

FIG. 5 is a plan view illustrating a pouch-type secondary battery in which pattern sealing parts are located on three sides.

Figure 6:
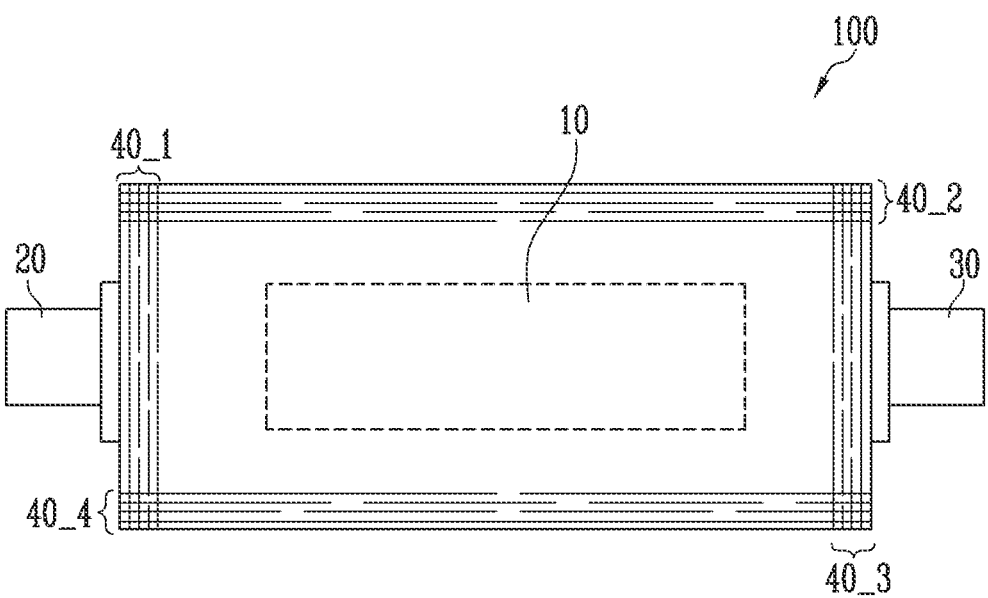

FIG. 6 is a plan view illustrating a pouch-type secondary battery in which pattern sealing parts are located on four sides.

DETAILED DESCRIPTION

The structural or functional description of the embodiments disclosed in the present specification or application is merely illustrative for the purpose of describing embodiments according to the technical spirit of the present disclosure, and the embodiments according to the technical spirit of the present disclosure can be implemented in various forms other than the embodiments disclosed in the present specification or application, and cannot be construed as limited to the embodiments set forth in the present specification or application.

A pouch-type secondary battery according to the present disclosure may include an external member, a cathode, an anode, and a separator.

Each of the cathode and anode may include a current collector and an active material layer disposed on the current collector. For example, the cathode may include a cathode current collector and a cathode active material layer, and the anode may include an anode current collector and an anode active material layer.

The current collector may include a known conductive material in the range that does not cause a chemical reaction in a lithium secondary battery. For example, the current collector may include any one of stainless steel, Ni, Al, Ti, Cu, and alloys thereof, and may be provided in various forms such as film, sheet, foil, and the like.

The active material layer includes an active material. For example, the cathode active material layer may include a cathode active material, and the anode active material layer may include a anode active material.

The cathode active material may be a material in which Li ions can be inserted and detached. The cathode active material may be lithium metal oxide. For example, the cathode active material may be one of lithium manganese oxides, lithium nickel oxides, lithium cobalt oxides, lithium nickel manganese oxides, lithium nickel cobalt manganese oxides, lithium nickel cobalt aluminum oxides, lithium iron phosphate compounds, lithium phosphate manganese compounds, lithium phosphate cobalt compounds, and lithium phosphate vanadium compounds, but is not necessarily limited to specific examples.

The anode active material may be a material in which lithium ions can be stored and detached. For example, the anode active material may be any one of crystalline carbon, amorphous carbon, carbon composite, carbon fiber or other carbon-based material, lithium alloy, Si, and Sn, According to an embodiment, the anode active material may be natural graphite or artificial graphite, but is not limited to a particular example.

Each of the cathode and anode may further include a binder and a conductive material.

The binder may mediate the bond between the current collector and the active material layer, thereby improving mechanical stability. According to an embodiment, the binder may be an organic binder or a water-based binder and may be used with a thickener such as carboxymethyl cellulose (CMC). According to an embodiment, the organic binder is any one of vinylidene fluoride-hexafluoropropylene copolymer (PVDF-co-HFP), polyvinylidene fluoride (PVDF), polyacrylonitrile, and polymethylmethancrylate, and the water-based binder may be, styrene-butadiene rubber (SBR), but is not necessarily limited thereto.

The conductive material may improve the electrical conductivity of lithium secondary batteries. The conductive material may include a metal-based material. According to an embodiment, the conductive material may include a conventional carbon based conductive material. For example, the conductive material may include any one of graphite, carbon black, graphene, and carbon nanotubes. Preferably, the conductive material may include carbon nanotubes.

The separator may be disposed between the cathode and anode. The separator is configured to prevent electrical short circuits between the cathode and anode, and to generate the flow of ions.

According to an embodiment, the separator may include a porous polymer film or a porous nonwoven fabric. Here, the porous polymer film may be composed of a single layer or multiple layers, including polyolefin-based polymers such as ethylene polymers, propylene polymers, ethylene/butene copolymers, ethylene/hexene copolymers, and ethylene/methacrylate copolymers. The porous nonwoven fabric may include glass fibers with a high melting point, polyethylene terephthalate fibers. However, it is not limited thereto, and according to an embodiment, the separator may be a ceramic coated separator (CCS) including ceramic.

According to an embodiment, an electrode cell including a cathode, an anode, and a separator may be provided. A plurality of electrode cells may be provided and may be sequentially stacked in an external member.

According to an embodiment, an electrode cell including a cathode, an anode, and a separator may be provided. A plurality of electrode cells may be provided to perform winding, lamination, or folding, thereby providing an electrode assembly.

The electrode assembly may be provided with an electrolyte to produce a lithium secondary battery according to an embodiment.

The electrolyte may be a non-aqueous electrolyte. The electrolyte may include lithium salts and organic solvents.

According to an embodiment, the organic solvent may include one of propylene carbonate (PC), ethylene carbonate (EC), diethyl carbonate (DEC), dimethyl carbonate (DMC), ethyl methyl carbonate (EMC), methylpropyl carbonate (MPC), dipropyl carbonate (DPC), vinylene carbonate (VC), dimethyl sulfoxide, acetonitrile, dimethoxyethane, diethoxyethane, sulfolane, gamma-butyrolactone, propylene sulfide, and tetrahydrofuran.

The present disclosure is a pouch-type secondary battery, including an electrode assembly, and a pouch film including an accommodating part in which the electrode assembly is disposed inside and a sealing part formed by fusion of edges of the accommodating part, wherein the sealing part includes a pattern sealing part on one or more sides among four sides of the pouch-type secondary battery, wherein the pattern sealing part includes a plurality of sealings provided with one or more discontinuous parts.

FIG. 1 is a plan view illustrating a pouch-type secondary battery including one pattern sealing part. Referring to FIG. 1, a pouch-type secondary battery 100 according to an embodiment of the present disclosure includes an electrode assembly; and a pouch film including an accommodating part 10 in which the electrode assembly is disposed inside and a sealing part formed by fusion of edges of the accommodating part.

The pouch-type secondary battery 100 of FIG. 1 is shown as an example in which a cathode terminal 20 and an anode terminal 30 extended in the electrode assembly exist in different sides, respectively, and are not limited thereto. For example, in the pouch-type secondary battery of the present disclosure, the cathode terminal 20 and the anode terminal 30 extended in the electrode assembly may exist on the same side.

The sealing part includes a pattern sealing part 40 on one or more of the four sides of the pouch-type secondary battery 100, and the pattern sealing part 40 includes a plurality of sealings provided with one or more discontinuous parts.

The pattern sealing part includes a plurality of seals, for example, as shown in FIG. 1, it may include a plurality of sealings of n sealings, i.e., A1 to An (where n is an integer of 2 or more). The number of sealings of the pattern sealing part may be 2 or more, 3 or more, 4 or more, or 5 or more, 10 or less, 9 or less, 8 or less, or 7 or less, for example, 2 to 10, 3 to 9, or 4 to 8. According to the size of the pouch-type secondary battery according to the present disclosure, the number of sealings included in each pattern sealing part may be different. If the number of sealings in the pattern sealing part is too small or too large, the effect of dissipating the pressure of the gas generated inside the pouch may be insignificant, or the space efficiency inside the pouch may be reduced.

The discontinuous part provided in any one of the pattern sealing parts and the discontinuous part provided in another sealing adjacent to the sealing may not be neighboring each other. Due to the trend of high-capacity battery design, gas is generated during the cycle life in recent batteries, causing venting of the pouch sealing part, and as the gas pressure inside the battery increases, the most vulnerable part of the pouch sealing part is pushed out, resulting in a vent. Since the pattern sealing part of the pouch-type secondary battery according to the present disclosure includes a plurality of sealings in discontinuous parts not neighboring each other, the inside of the pattern sealing part serves as a gas passage having various paths. Therefore, since the gas generated inside the pouch may be dispersed in various pathways, the force causing the vent at the vulnerable site may be distributed to other sites.

The interval between the respective sealings of the pattern sealing part ray be at least 0.1 mm, at least 0.15 mm, at least 0.2 mm, at least 0.25 mm, or at least 0.3 and may be 5 mm or less, 4.5 mm or less, 4 mm or less, 3.5 mm or less, or 3 mm or less, for example, 0.1 to 5 mm, 0.15 to 4.5 mm, or 0.2 to 4 mm. According to the size of the pouch-type secondary battery according to the present disclosure, the interval between the respective sealings included in each pattern sealing part may be different. If the interval between the sealings of the pattern sealing part is too narrow or too wide, the effect of dissipating the pressure of the gas generated inside the pouch may be insignificant, or the space efficiency inside the pouch may be reduced.

The width of each sealing of the pattern sealing part may be at least 0.1 mm, at least 0.15 mm, at least 0.2 mm, at least 0.25 mm or at least 0.3 mm, and may be 5 mm or less, 4.5 mm or less, 4 mm or less, 3.5 mm or less, or 3 mm or less, for example, 0.1 to 5 mm, 0.15 to 4.5 mm or 0.2 to 4 mm. According to the size of the pouch-type secondary battery according to the present disclosure, the width of each sealing included in each pattern sealing part may be different. If the width between the sealings of the pattern sealing part is too narrow or too wide, the effect of dissipating the pressure of the gas generated inside the pouch may be insignificant, or the space efficiency inside the pouch may be reduced.

The total sum of the widths of the discontinuous parts provided in any one sealing of the pattern sealing part may be 0.1% or more, 0.5% or more, 1% or more, 1.5% or more, 1.5% or more, or 3% or more, and 10% or less, 8% or less, 6% or less, or 5% or less with respect to 100% of the total width of the side of the pouch-type secondary battery where the sealing is located, for example, 0.1% to 10%, 1% to 8% or 3% to 6%. When the total sum of the widths of the discontinuous parts provided in any one sealing of the pattern sealing part exceeds the above value, the effect of dissipating the pressure of the gas generated inside the pouch may be insignificant, or the space efficiency inside the pouch may be reduced.

The area of the pattern sealing part may be at least 10%, at least 15%, at least 20%, at least 25% or at least 30%, and may be 90% or less, 80% or less, 70% or less, 60% or less or 50% or less with respect to 100% of the total area of the sealing part, for example, 10% to 90%, 15% to 80% or 30% to 50%. When the area of the pattern sealing part exceeds the above value, the effect of dissipating the pressure of the gas generated inside the pouch may be insignificant, or the space efficiency inside the pouch may be reduced.

The pouch type secondary battery according to the present disclosure may include two or more pattern sealing parts, and the pattern sealing part may be located on one or more sides among four sides of the pouch type secondary battery.

For example, FIG. 2 is a plan view illustrating a pouch-type secondary battery in which two pattern sealing parts 40_1 and 40_2 are located on neighboring sides, and FIG. 3 is a plan view illustrating another example of a pouch-type secondary battery in which two pattern sealing parts 40_1 and 40_2 are located on neighboring sides. Referring to FIG. 2, the two pattern sealing parts 40_1 and 40_2 may be located on one side of the pouch-type secondary battery in which the cathode terminal 20 exists and on one side of the pouch-type secondary battery in which the anode terminal 30 exists. Referring to FIG. 3, the two pattern sealing parts 40_1 and 40_2 may be located on the side of a pouch-type secondary battery in which the cathode terminal 20 and the anode terminal 30 do not exist, respectively.

In addition, in the pouch-type secondary battery of the present disclosure, two pattern sealing parts may be located on sides not neighboring each other. FIG. 4 is a plan view illustrating a pouch-type secondary battery in which two pattern sealing parts are located on sides not neighboring each other. Referring to FIG. 4, the two pattern sealing parts 40_1 and 40_2 may be located on one side of the pouch-type secondary battery in which the cathode terminal 20 exists and a side not neighboring the one side, i.e., one side where the cathode terminal 20 and the anode terminal 30 do not exist.

In addition, FIG. 5 is a plan view illustrating a pouch-type secondary battery in which pattern sealing parts are located on three sides. Referring to FIG. 5, three pattern sealing parts 40_1, 40_2, and 40_3 are located on two neighboring sides where the cathode terminal 20 and the anode terminal 30 exist, and on one side not neighboring the said two sides. As another example of a pouch-type secondary battery including three pattern sealing parts, although not shown in the figures, three pattern sealing parts may be located on two neighboring sides where the cathode terminal 20 and the anode terminal 30 do not exist and on one side not neighboring the said two sides.

FIG. 6 is a plan view illustrating a pouch-type secondary battery in which pattern sealing parts are located on four sides. Referring to FIG. 6, four pattern sealing parts 40_1, 40_2, 40_3, and 40_4 may be located on all four sides of the pouch-type secondary battery.

The battery module according to an embodiment of the present disclosure includes a pouch-type secondary battery according to an embodiment of the present disclosure as a unit cell. The inside of the pattern sealing part included in the pouch-type secondary battery according to an embodiment of the present disclosure serves as a gas passage having various paths. Therefore, since the gas generated inside the pouch may be dissipated in various pathways, the force causing the vent at the vulnerable site may be distributed to another site, and the battery module including the pouch-type secondary battery of the present disclosure as a unit cell may have improved stability with respect to gas pressure and the like.

The device according to an embodiment of the present disclosure includes a battery module according to an embodiment of the present disclosure as a power source.

While the present disclosure has been shown and described with reference to certain exemplary embodiments thereof, it will be understood by those skilled in the art that various changes in form and details may be made therein without departing from the spirit and scope of the present disclosure as defined by the appended claims and their equivalents. Therefore, the scope of the present disclosure should not be limited to the above-described exemplary embodiments but should be determined by not only the appended claims but also the equivalents thereof.

In the above-described embodiments, all steps may be selectively performed or part of the steps and may be omitted. In each embodiment, the steps are not necessarily performed in accordance with the described order and may be rearranged. The embodiments disclosed in this specification and drawings are only examples to facilitate an understanding of the present disclosure, and the present disclosure is not limited thereto. That is, it should be apparent to those skilled in the art that various modifications can be made on the basis of the technological scope of the present disclosure.

Meanwhile, the exemplary embodiments of the present disclosure have been described in the drawings and specification. Although specific terminologies are used here, those are only to explain the embodiments of the present disclosure. Therefore, the present disclosure is not restricted to the above-described embodiments and many variations are possible within the spirit and scope of the present disclosure. It should be apparent to those skilled in the art that various modifications can be made on the basis of the technological scope of the present disclosure in addition to the embodiments disclosed herein.

What is claimed is:

1. A pouch-type secondary battery, comprising:
an electrode assembly; and
a pouch film comprising an accommodating part in which the electrode assembly is disposed and a sealing part formed by fusion of edges of the accommodating part,
wherein the sealing part comprises a pattern sealing part on all sides of the pouch-type secondary battery,
wherein the pattern sealing part comprises a plurality of sealings provided with one or more discontinuous parts,
wherein an interval between respective sealings of the pattern sealing part is 0.1 to 5 mm,
wherein a width of each sealing of the pattern sealing part is 0.1 to 5 mm,
wherein a total sum of widths of the one or more discontinuous parts provided in a sealing of the pattern sealing part is 0.1% to 10% with respect to 100% of a total width of a side of the pouch-type secondary battery in which the sealing of the pattern sealing part is located, and

wherein an outermost sealing among the plurality of sealings in the pattern sealing part has no discontinuous part.

2. The pouch-type secondary battery of claim 1, wherein the one or more discontinuous parts provided in the sealing of the pattern sealing part and the one or more discontinuous parts provided in another sealing adjacent to the sealing of the pattern sealing part are not neighboring each other.

3. The pouch-type secondary battery of claim 1, wherein a number of the plurality of sealings of the pattern sealing part is 2 to 10.

4. The pouch-type secondary battery of claim 1, wherein an area of the pattern sealing part is 10% to 90% with respect to 100% of a total area of the sealing part.

5. The pouch-type secondary battery of claim 1, wherein two pattern sealing parts are located on sides neighboring each other.

6. The pouch-type secondary battery of claim 1, wherein two pattern sealing parts are located on sides not neighboring each other.

7. A battery module comprising the pouch-type secondary battery according to claim 1 as a unit cell.

8. A device comprising the battery module according to claim 7 as a power source.

* * * * *